(12) United States Patent
Arnold et al.

(10) Patent No.: US 8,161,045 B2
(45) Date of Patent: Apr. 17, 2012

(54) USE OF ASSOCIATE MEMORY LEARNING AGENT TECHNOLOGY TO IDENTIFY INTERCHANGEABLE PARTS IN PARTS CATALOGS

(75) Inventors: William G. Arnold, Seattle, WA (US); Brian Warn, Seattle, WA (US); Leonard Jon Ouadracci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1175 days.

(21) Appl. No.: 11/670,210

(22) Filed: Feb. 1, 2007

(65) Prior Publication Data

US 2008/0189260 A1 Aug. 7, 2008

(51) Int. Cl.
*G06F 7/00* (2006.01)
*G06F 17/30* (2006.01)

(52) U.S. Cl. ........................................ 707/736; 707/748

(58) Field of Classification Search ........................ None
See application file for complete search history.

(56) References Cited

U.S. PATENT DOCUMENTS

| | | | | |
|---|---|---|---|---|
| 5,659,742 | A * | 8/1997 | Beattie et al. ........................ | 1/1 |
| 6,892,185 | B1 | 5/2005 | Van Etten et al. | |
| 7,680,706 | B2 * | 3/2010 | Bowser et al. .................. | 705/28 |
| 2005/0125261 | A1 * | 6/2005 | Adegan ............................. | 705/4 |

FOREIGN PATENT DOCUMENTS

| | | |
|---|---|---|
| JP | 2007249958 A | 9/2007 |
| WO | 0247001 A | 5/2002 |

OTHER PUBLICATIONS

Bridge et al., "An Expressive Query Language for Product Recommender Systems", Artificial Intelligence Review, Kluwer Academic Publishers, vol. 1, No. 3-4, Dec. 1, 2002, pp. 259-307.

He et al., "On Agent-Mediated Electronic Commerce", IEEE Transactions on Knowledge and Data Engineering, vol. 15, No. 4, Jul./Aug. 2003, pp. 985-1003.

* cited by examiner

*Primary Examiner* — Mussa A Shaawat

(74) *Attorney, Agent, or Firm* — Yee & Associates, P.C.

(57) ABSTRACT

The present invention provides a computer implemented method, apparatus, and computer usable program code for identifying interchangeable parts in parts catalogs. In one illustrative embodiment, a set of catalogs is searched for first attributes for a set of parts using an intelligent agent. The intelligent agent compares the first attributes for the set of parts to a set of second attributes for a selected part. A weight is assigned to each of the first attributes based on whether each of the first attributes is correlated to an attribute in the set of second attributes. Each part in the set of parts is ranked using the weight assigned to each attribute in the first attributes. A set of interchangeable parts is identified using the ranking for each part in the set of parts.

21 Claims, 10 Drawing Sheets

| Part# | Pkg | Price | Description | Additional | Req# | Year | Picture | Details |
|---|---|---|---|---|---|---|---|---|
| A21TWL | EACH | 108.95 | TIRE ☆☆☆☆☆ | LESTER 4.50" X 21" 2-3/8 WIDE WHITEWALL | A/R | 1926-1929 | | View Detail |
| A21TWF | EACH | 126.95 | TIRE ☆☆☆☆☆ | FIRESTONE 4.50" X 21" 2-3/8" WIDE WHITEWALL | A/R | 1926-1929 | | View Detail |
| A21TWG | EACH | 126.95 | TIRE ☆☆☆ | GOODRICH 4.50" X 21" 2-1/2" WIDE WHITEWALL | A/R | 1926-1929 | | View Detail |
| A21TBL | EACH | 98.95 | TIRE ☆☆☆ | BLACKWALL LESTER 4.50" X 21" | A/R | 1926-1929 | | View Detail |
| A21TBE | EACH | 78.95 | TIRE ☆☆☆ | 4.50" X 21" BLACKWALL TIRE EXCELSIOR BRAND | A/R | 1926-1929 | | View Detail |
| A21TBU | EACH | 79.95 | TIRE ☆☆☆ | BLACKWALL UNIVERSAL BRAND 4.50" X 21" | A/R | 1926-1929 | | View Detail |
| A21TBF | EACH | 101.95 | TIRE ☆☆☆ | BLACKWALL FIRESTONE 4.50" X 21" | A/R | 1926-1929 | | View Detail |
| A21TBG | EACH | 101.95 | TIRE ☆☆☆ | BLACKWALL GOODRICH 4.50" X 21" | A/R | 1926-1929 | | View Detail |

904  
Part Number msk4301hu •• msk4301hd Part Number

| Attributes | Evidence |

Matching Attributes | Non-Matching Attributes
Similarity Score: 5.33 ~908
Displaying 1-10 of 69 results found.

1 2 3 4 5 Last Next »

| ◆ Attribute Name ◆ | Value | ◆ Weight |
|---|---|---|
| JESD 30 Code | ncdfm-p20 | 0.89 ~911 |
| Document Title | 43d1 25 amp. 75 r. 3 phase master bridge with intelligent integrated gate drive | 0.83 ~912 |
| Datablock ID | mskcs00429 | 0.83 |
| Generic Number | 4301 | 0.83 |
| noun | cdfm20 | 0.73 |
| Publication Date | 1-aug-03 | 0.73 |
| adjective | intelligent | 0.73 |
| verb | integrate | 0.73 |
| noun | gate | 0.73 |
| noun | bridge | 0.75 |

1 2 3 4 5 Last Next »

902

906  
Part Number msk4301hd •• msk4301hs Part Number

| Attributes | Evidence |

Matching Attributes | Non-Matching Attributes
Similarity Score: 4.42 ~910
Displaying 1-10 of 69 results found.

1 2 3 4 5 Last Next »

| ◆ Attribute Name ◆ | Value | ◆ Weight |
|---|---|---|
| Document Title | 43D1 37 amp. 75 r. 3 phase master bridge with intelligent integrated gate drive | 0.83 ~914 |
| Datablock ID | mskcs00429 | 0.83 |
| Generic Number | 4301 | 0.83 |
| noun | cdfm20 | 0.73 |
| Publication Date | 1-aug-03 | 0.73 |
| adjective | intelligent | 0.73 |
| verb | integrate | 0.73 |
| noun | gate | 0.73 |
| noun | bridge | 0.70 |
| noun | a/r | 0.65 |

1 2 3 4 5 Last Next »

900

USE OF ASSOCIATE MEMORY LEARNING AGENT TECHNOLOGY TO IDENTIFY INTERCHANGEABLE PARTS IN PARTS CATALOGS

BACKGROUND

1. Field

The present invention relates generally to an improved data processing system and in particular to a database model. Still more particularly, the present invention relates to a computer implemented method, apparatus, and computer usable program code for using associative memory learning agent technology to identify part duplications and substitute parts in parts catalogs.

2. Background

Businesses frequently maintain numerous parts management databases in support of various commodity platforms and families of platforms. A commodity includes, but is not limited to, any equipment, vehicle, machine, device, or other manufactured item. A commodity may be, for example, an airplane, a car, a boat, a computer, a printer, a radar, an engine, a transmission, or any other device or manufactured item having one or more parts.

A parts catalog is a list of parts used to assemble one or more commodities. Parts catalogs typically identify parts by a unique part number (PN). Parts catalogs also frequently provide a description for each part number, referred to as a part number description. The part number description is a human readable text description of the part identified by a given part number.

Parts identified in different parts catalogs are frequently common in nature, made of common materials, and/or engineered in a common manner. An interchangeable part is an identical part to a specified part that has a different part number than the specified part. An interchangeable part may also include a similar part to a specified part that may be used in place of a specified part. Similar parts are referred to as substitute or alternate parts. As used herein, a specified part may be a part that is selected by a user, designer, manufacturer, and/or any other entity or process. Thus, a specified part may also be referred to as a selected part.

A parts catalog is often developed independently of other parts catalogs. That is, parts catalogs do not follow a uniform system for assigning part numbers that is consistent with other parts catalogs. Many parts that are duplicate parts or alternate parts are assigned differing part numbers or descriptions that do not allow them to be easily related to their sister parts for another platform or family of platforms.

For example, a bolt may be identified by one part number in a first parts catalog for an engine, and the exact same bolt may be given a different part number in a second parts catalog for an air conditioner. A simple query to locate identical parts in different parts catalogs based on part numbers would not accurately identify interchangeable parts. Therefore, it is generally necessary to search the text descriptions corresponding for each part number in differing parts catalogs to identify interchangeable parts.

Parts catalogs frequently provide part number descriptions with widely varying amounts of information. In other words, different parts catalogs often provide part description information in differing formats with differing degrees of information describing the part. For example, a first parts catalog may describe a bolt as "zinc plated" while a second parts catalog may describe an identical or equivalent bolt as "zn coated." While these two descriptions are essentially the same, the differing formats of the text description may prevent traditional relational database queries from identifying the bolt in the first parts catalog as being equivalent to the bolt in the second parts catalog because currently available relational database systems identify interchangeable parts by matching identical part number descriptions. Thus, if a part number description in a first parts catalog contains a misspelled word, different abbreviations, or places the words in the description in a different order than a second parts catalog, a relational database query may not identify an interchangeable part in the second parts catalog because the descriptions for the part numbers are not identical.

Moreover, as platforms are modified over time and replacement parts are introduced into the system, updated part number descriptions that highlight differences in the modified platforms are often resident in data fields that are not readily searched using traditional relational database queries. Therefore, when a user enters a relational database query to identify interchangeable parts in a set of parts catalogs, the relational database may be unable to accurately identify all duplicate and/or substitute parts for the specified part.

To avoid this problem, a human user can manually read through each parts catalog line by line to identify duplicate and substitute parts. However, parts catalogs can be of significant size. Therefore, this process can be time consuming, burdensome, and cost prohibitive. Therefore, it would be advantageous to have an improved computer implemented method, apparatus, and computer usable program code identifying interchangeable parts in catalogs.

SUMMARY

Advantageous embodiments of the present invention provide a computer implemented method for identifying interchangeable parts in parts catalogs. In one illustrative embodiment, a set of catalogs is searched for first attributes for a set of parts using an intelligent agent. The intelligent agent compares the first attributes for the set of parts to the set of second attributes for a selected part. A weight is assigned to each of the first attributes based on whether each of the first attributes is correlated to an attribute in the set of second attributes. Each part in the set of parts is ranked using the weight assigned to each attribute in the first attributes. A set of interchangeable parts is identified using the ranking for each part in the set of parts.

In another advantageous embodiment, a computer implemented method for identifying interchangeable parts is provided. A set of attributes for each part in a set of parts is identified. A rank is assigned to each part in the set of parts based on a degree of correlation between the set of attributes for a part in the set of parts and a set of identified attributes to form a set of ranked parts. A set of interchangeable parts from the set of parts is identified using the set of ranked parts.

Another advantageous embodiment provides an apparatus comprising a bus system; a communications system connected to the bus system; a memory connected to the bus system, wherein the memory includes computer usable program code; and a processing unit connected to the bus system. The processing unit executes the computer usable program code to search a set of catalogs for first attributes for a set of parts using an intelligent agent. The intelligent agent compares the first attributes for the set of parts to a set of second attributes for a selected part. The processing unit executes the computer usable program code to assign a weight to each of the first attributes based on whether each of the first attributes is correlated to an attribute in the set of second attributes and rank each part in the set of parts using the weight assigned to each attribute in the first attributes. The processing unit also executes the computer usable program code to identify a set of interchangeable parts using the ranking for each part in the set of parts.

In another illustrative embodiment, a computer program product having computer usable program code encompasses the steps for identifying interchangeable parts. The computer program product is executed to perform the steps in the method.

The features, functions, and advantages can be achieved independently in various embodiments of the present invention or may be combined in yet other embodiments.

BRIEF DESCRIPTION

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 7 is a diagram illustrating a list of potential interchangeable parts results in accordance with an advantageous embodiment of the present invention;

FIG. 9 is a diagram illustrating an interchangeable part result page with weighted attributes in accordance with an advantageous embodiment of the present invention;

DESCRIPTION

Figure 1:
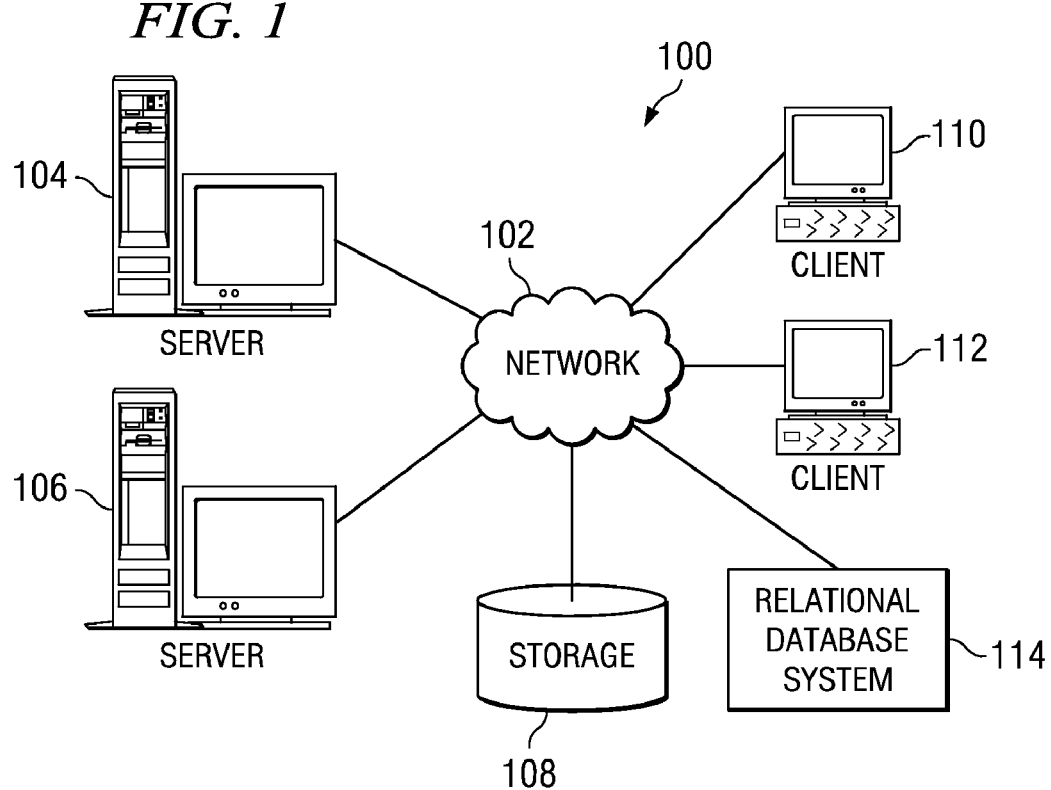
FIG. 1 is an exemplary diagram of a data processing environment in which an advantageous embodiment of the present invention may be implemented.

With reference now to the figures and in particular with reference to FIG. 1, an exemplary diagram of a data processing environment is provided in which advantageous embodiments may be implemented. It should be appreciated that FIG. 1 is only exemplary and is not intended to assert or imply any limitation with regard to the environment in which different embodiments may be implemented. Many modifications to the depicted environment may be made.

FIG. 1 depicts an exemplary diagram of a data processing environment in which an advantageous embodiment of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 and relational database system 114 connect to network 102. Clients 110 and 112 may be, for example, personal computers or network computers. Clients 110 and 112 are clients to server 104 in this example.

Relational database system 114 includes one or more databases for performing functions, such as storing, receiving, sorting, querying, organizing, and/or manipulating part numbers and part number descriptions from one or more parts catalogs. Part number description data is data regarding the size, features, properties, manufacturing materials, and/or any other data describing a part. In other words, part number description data is any data regarding a part identified by a given part number. The part number description data may be obtained from one or more data sources.

In these examples, relational database system 114 includes one or more relational databases; however, relational database system 114 also may include databases that are not relational databases. Relational database system 114 may be located on a single data processing system. Relational database system 114 can also be distributed across different data processing systems that may be located in different locations, depending on the embodiment.

Relational database system 114 also includes data from a set of parts catalogs. A set of parts catalogs is a set of one or more parts catalogs. In one embodiment, relational database system 114 includes a parts management database for storing part numbers and corresponding part number descriptions from the set of one or more parts catalogs.

As used herein, a parts catalog is any listing of part numbers and corresponding part number descriptions. A part number is an identifier assigned to a given part. A part may include one or more subparts. The term "subpart" refers to a part, piece, or constituent of a commodity or another part. Each subpart of a part may likewise include one or more other subparts, which may be referred to as sub-subparts. A sub-subpart may also have subparts and so forth. Each of the parts, subparts, and sub-subparts of a commodity may be identified by different part numbers and/or different part number descriptions in different parts catalogs.

In the advantageous embodiments, a user queries the parts management database within relational database system 114 for information regarding interchangeable parts. An interchangeable part is any part that is identical or a duplicate to a specified part, a substitute part for a specified part, and/or a duplicate of the specified part. A substitute part is an alternate part to a specified part. The substitute part may not be identical to the specified part, but the substitute part may serve as a replacement to the specified part. In other words, a substitute part may be an equivalent to a specified part.

Relational database system 114 provides part numbers and corresponding part number descriptions for a specified part and all interchangeable parts to the specified part as output to computer, such as client 110 and client 112 in response to a user request or query. The set of interchangeable parts are identified from a set of one or more parts catalogs. The parts catalogs may use different part numbering systems and different part number description formats. As used herein, the term "set of" may refer to a set of one or more.

In the depicted example, network data processing system 100 is the Internet with network 102 representing a worldwide collection of networks and gateways that use the Transmission Control Protocol/Internet Protocol (TCP/IP) or similar suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an Intranet, a local area network (LAN), or a wide area network (WAN). FIG. 1 is intended as an example, and not as an architectural limitation for different embodiments.

The different processes for the advantageous embodiments of the present invention may be implemented in a server, client, or combination of server and client computers. For example, the processes and data may be located at a single client, such as client 110, alternatively, the processes for providing the simulations may be located on a server, such as server 104 with the client containing a process for providing user input and presenting output, such as through a browser program. The different processes for the advantageous embodiments of the present invention may also be implemented in any relational database system, such as relational database system 114.

Likewise, the illustrative embodiments may be implemented in relational database system 114 connected to a network, a server, a client, or combinations of server and client computers. In addition, network data processing system 100 may include additional servers, clients, databases, data storage devices, and other devices not shown in FIG. 1. However, the illustrative embodiments do not require relational database system 114 to be connected to a network, server, and/or a client. The illustrative embodiments may also be implemented in relational database system 114 in a stand-alone computing device that is not connected to the Internet or any other network.

Figure 2:
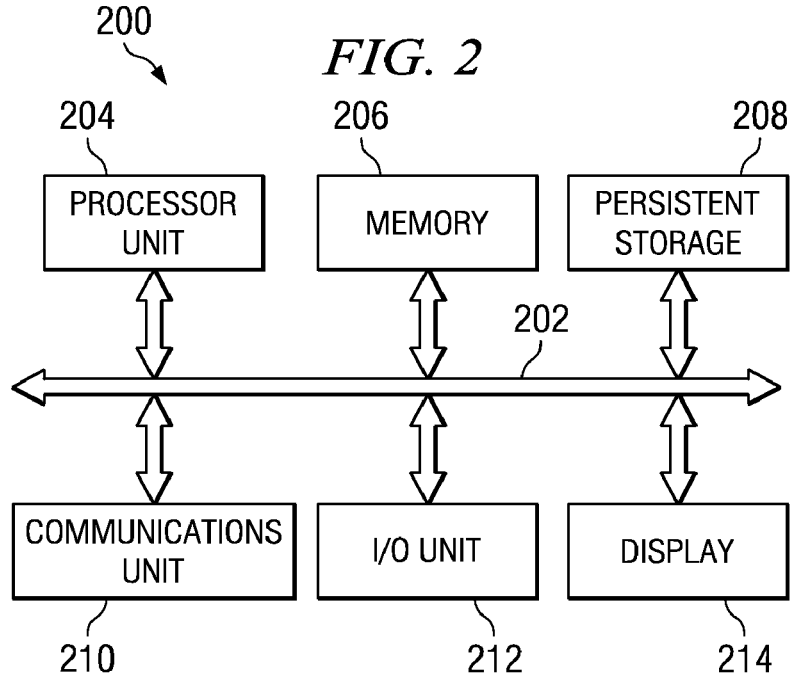
FIG. 2 is a diagram of a data processing system in accordance with an advantageous embodiment of the present invention.

Turning now to FIG. 2, a diagram of a data processing system is depicted in accordance with an advantageous embodiment of the present invention. Data processing system 200 is an example of a data processing system that may be used to implement different processes for an advantageous embodiment of the present invention.

Data processing system 200 may be used to implement different computers, such as, for example, client 110 or server 104 in FIG. 1. In this illustrative example, communications fabric 202 provides communications between processor unit 204, memory 206, persistent storage 208, communications unit 210, I/O unit 212, and display 214. Communications fabric 202, in these examples, takes the forms of a bus. Of course, communications fabric 202 may take any form that provides communications between the different components of data processing system 200.

Processor unit 204 executes instructions for software that may be loaded into memory 206. Processor unit 204 may be a set of one or more processors or may be a multi-processor core depending on the particular implementation. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system, the object-oriented programming system, and applications or programs are located on persistent storage 208. These instructions and may be loaded into memory 206 for execution by processor unit 204. The processes of the illustrative embodiments may be performed by processor unit 204 using computer implemented instructions, which may be located in a memory, such as memory 206.

The different advantageous embodiments recognize that parts contained in parts catalogs may be common in nature, made of common materials, and engineered in common manners but assigned different part numbers and varying descriptions. The embodiments also recognize a number of definitions in currently available relational database systems. For example, current relational database queries can only match identical part number descriptions to identify interchangeable parts. Current relational database systems cannot identify interchangeable parts if the part number descriptions are provided in a different free text format, contain misspelled words, symbols, acronyms, or other variations in the descriptions of different part numbers.

The illustrative embodiments recognize that it would be advantageous to accurately identify all interchangeable parts in parts catalogs and/or in current inventory regardless of variations, differing formats, differing abbreviations, variations in word spelling, and other inconsistencies in part number descriptions. The illustrative embodiments recognize that identifying all interchangeable parts in this manner would permit a user to combine part orders, leverage part purchase quantity to drive down part costs, reduce inventory, and improve overall efficiency.

Advantageous embodiments of the present invention provide a computer implemented method, apparatus, and computer usable program code for identifying interchangeable parts in parts catalogs. In one illustrative embodiment, a set of catalogs is searched for first attributes for a set of parts using an intelligent agent. The intelligent agent compares the first attributes for the set of parts to a set of second attributes for a selected part. A weight is assigned to each of the first attributes based on whether each of the first attributes is correlated to an attribute in the set of second attributes. Each part in the set of parts is ranked using the weight assigned to each attribute in the first attributes. A set of interchangeable parts is identified using the ranking for each part in the set of parts.

Assigning a weight to each attribute may include identifying a special expression in a text description for a part. An attribute corresponding to the special expression is identified to determine a similarity between different parts that may not be identifiable using queries in a relational database to identify commonalities in text descriptions of parts.

Another advantageous method also provides a computer implemented method for identifying interchangeable parts. A set of attributes for each part in a set of parts is identified. A rank is assigned to each part in the set of parts based on a degree of correlation between the set of attributes for a part in the set of parts and a set of identified attributes to form a set of ranked parts. A set of interchangeable parts from the set of parts is identified using the set of ranked parts.

In this embodiment, the set of identified attributes are attributes associated with a selected part. A text description from a parts catalog associated with the selected part is parsed by an intelligent agent to identify attributes of the selected part to form the identified attributes. The intelligent agent also parses text descriptions from a set of parts catalogs associated with the set of parts to identify the set of attributes for each part.

The intelligent agent may also compare each attribute in a set of attributes for a given part in the set of parts to the identified attributes and assign a weight to each attribute based on whether each attribute in the set of attributes is correlated to an identified attribute. A rank is assigned to the given part using the weight assigned to each attribute.

In one embodiment, a given attribute is discarded in response to a determination that the weight assigned to the given attribute is less than or equal to a threshold weight. In response to a determination that the weight assigned to a given attribute is greater than a threshold weight, the given attribute is selected to form a set of selected attributes. The set of selected attributes is used to rank each part in the set of parts.

In one embodiment, assigning a weight to each attribute may also include identifying a special expression in a text description for a part and identifying an attribute corresponding to the special expression. The attribute corresponding to the special expression is used to determine a similarity between different parts.

In another example, comparing each attribute in a set of attributes for a given part to the identified attributes may include checking a configuration file to identify a value correlated to a given attribute using a set of name-value pairs associated with the given attribute. The value is used to determine a similarity between different parts.

Figure 3:
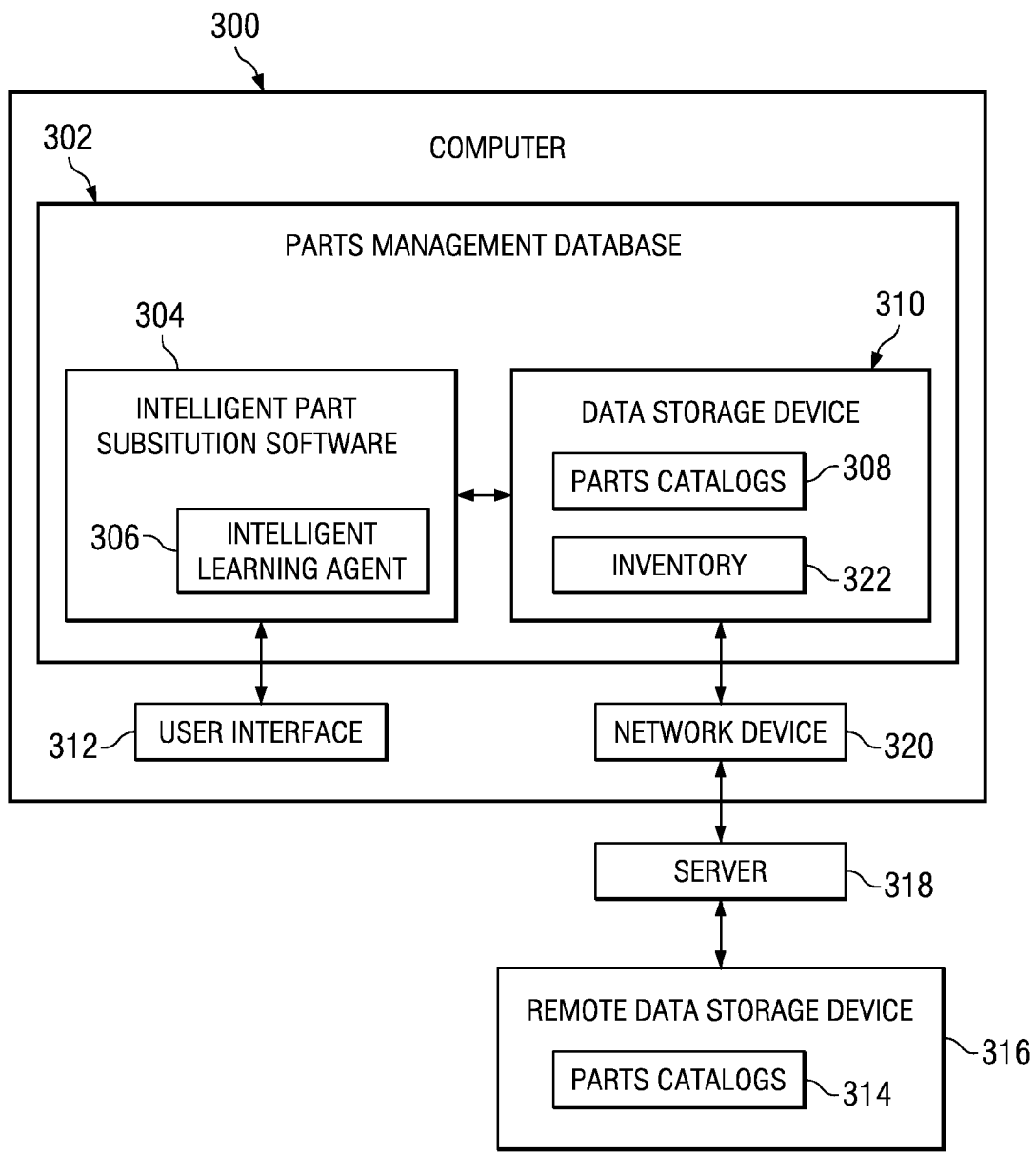
FIG. 3 is a diagram of a data flow through a relational database system for identifying interchangeable parts to a user in accordance with an advantageous embodiment of the present invention.

Referring now to FIG. 3, a diagram of a data flow through a relational database system for identifying interchangeable parts to a user is shown in accordance with an advantageous embodiment of the present invention. Computer 300 may be implemented using any type of computing device, such as a personal computer, laptop, personal digital assistant, or any other computing device depicted in FIGS. 1 and 2.

Parts management database 302 is a relational database for identifying interchangeable parts in parts catalogs. Parts management database 302 may be implemented using any type of known or available relational database system, including, but not limited to, an Oracles database system or a MySQL® database system.

Interchangeable parts are duplicate parts, substitute parts, and/or subparts of a specified part. In other words, an interchangeable part is a part that is identical or similar to a specified part. An interchangeable part can be substituted for or used in place of the specified part.

Parts management database 302 includes intelligent part substitution software 304. Intelligent part substitution software 304 is software for parsing text descriptions for corresponding part numbers and identifying interchangeable parts based on the part number text descriptions.

In some cases, a part number description is included with the corresponding part number in the parts catalog. However, a part number description may also be appended to the part number record in a database as a free text portable document format (PDF) file form.

Intelligent part substitution software 304 presents the specified part numbers and all interchange part numbers identified for the specified parts in a list that is provided to the user. In one embodiment, the list includes a similarity score or ranking that identifies how similar a given part number is as to the identified part. The ranking is a relative value indicating how much that part looks like or is similar to the specified part. Intelligent learning agent 306 compares each and every item to each and every other item to assign ranking or similarity score to each item. The ranking can be used to identify duplications or specified parts and the best substitute parts for a specified part to decrease costs, coordinate, and leverage purchasing. In other words, an identical part to the specified part would have a highest similarity score. A part that is least likely to be acceptable as an alternate part would be given the lowest similarity score.

Intelligent part substitution software 304 includes intelligent learning agent 306. Intelligent learning agent 306 is an intelligent learning agent using an associative memory learning agent technology. Intelligent learning agent 306 may be any type of intelligent learning agent software, including, but not limited to, Saffron® intelligent learning agent software.

Intelligent part substitution software 304 uses data mining techniques to obtain part numbers and corresponding part number text descriptions from parts catalogs 308. Intelligent learning agent 306 uses associative memory learning agent technology to decompose or parse free text of the part number descriptions for the specified part number and the other part number descriptions for attributes to identify duplicate parts, substitute parts, and subsets of sets of parts in parts catalogs. Intelligent learning agent 306 may also identify potential alternative parts.

Intelligent learning agent 306 is an intelligent agent that may learn from observations previously made by intelligent learning agent 306. Intelligent learning agent 306 may be implemented using a number of different processes. For example, intelligent learning agent 306 may learn based on data observed by collecting data from a set of sensors. A set of sensors includes one or more sensors. Intelligent learning agent 306 also includes processes to analyze data using associative memories.

In the depicted examples, intelligent learning agent 306 includes artificial intelligence. An artificial intelligence system implemented in intelligent learning agent 306 may include machine learning characterized by formalism and statistical analysis. Artificial intelligence systems may include expert systems, case-based reason systems, Bayesian networks, and behavior-based artificial intelligence.

Artificial intelligence systems also may include processes that have iterative development or learning. This type of system is also referred to as computational intelligence. Computational intelligence systems include, for example, neural networks, fuzzy systems, and evolutionary computation. Further, an artificial intelligence system may be hybrid that includes processes both from a conventional artificial intelligence and computational intelligence system.

For example, these processes in intelligent learning agent 306 may include at least one of an artificial intelligence program, a fuzzy system, and a neural network. In other words, intelligent learning agent 306 may be an artificial intelligence program, a fuzzy system, or a neural network, or any combination of an artificial intelligence program, a fuzzy system, and/or a neural network.

Examples of artificial intelligence processes that may be used to implement intelligent learning agent 306, in these examples, may be found in Saffron® One, which is a product from Saffron Technology, Inc. Of course, any type of program or code that has processes for analyzing data and using memory models and/or associative memory to come to conclusions or results may be implemented in accordance with the illustrative embodiments.

Any type of associative memory may be used. In one example, an associative memory is a square matrix containing columns and rows of cells. In some implementations, the associative memory is not represented as a square but a triangle or half-square. In addition, columns and rows may be added to associative memory, unlike relational database models in which the columns are decided ahead of time and cannot be changed. In other words, an associative memory may start as a zero-by-zero metrics and grow as observations are made by computer 300 associated with the associative memory.

In an associative memory, each cell contains a value. Each column and each row in the matrix represents an attribute. Thus, a single cell may represent one or more attributes. For example, a cell identified by a column and a row represents an association between two attributes. Each cell typically signifies the number of times that the two attributes have occurred at the same time.

Further, in some associative memories, the cells contain identification as to whether an association ever occurred using a value such as a one or zero. Moreover, the associative memory also may be implemented to count every time an association is seen between attributes. Also, the storage of data within the associative memory may be optimized using different processes. For example, a column or row order may be changed to move all the non-zero values towards one corner of the metrics.

Also, depending on the particular implementation, intelligent learning agent 306 may use any other type of memory model implemented in storage other than associative memory. For example, intelligent learning agent 306 may utilize a memory model implemented as a neural network rather than an associative memory.

Attributes are discriminators used to compare part number descriptions for parts with different part numbers. Attributes include part-specific words, symbols, values, abbreviations, and attribute patterns. Intelligent learning agent 306 then establishes associations between attributes within a single part number text description entry and text description entries associated with other part numbers. In other words, intelligent learning agent 306 identifies attributes in the other part number descriptions that correspond to attributes in the specified part number descriptions, even if the attributes are not identical or exactly the same.

For example, if the specified part number description contains an attribute 2.5 inches for a fastener, prior art queries would only recognize free text descriptions that contained "2.5 inches". Prior art queries would not recognize 2½ inches, 2½ in., 2.5", or any other variations. However, intelligent learning agent 306 is able to identify attributes such as 2½ inches, 2½ in., or 2.5" as corresponding to the attribute 2.5 inches in the specified part number. Thus, intelligent learning agent 306 is able to derive relationships among the decomposed text entries to establish relationships between part numbers that are not obvious using queries normally used in relational databases to identify commonalities between part number descriptions that are not identical free text descriptions.

Thus, intelligent learning agent 306 identifies relationships between words, abbreviations, letters, numbers, and symbols found in differing part number text descriptions. Intelligent learning agent 306 rates the relationships between the text descriptions for a specified part and text descriptions for other part numbers in accordance with how similar and/or dissimilar the other parts are to the specified part. In other words, intelligent learning agent 306 parses through the data in a text description for a part and assigns a similarity score or relative ranking to the part.

Parts catalogs 308 are a set of one or more parts catalogs containing part numbers and part number descriptions corresponding to the part numbers. Parts catalogs 308 include data provided by manufacturers in electronic parts catalogs, as well as data manually entered into parts catalogs 308 by a user. Parts catalogs 308 are stored in associative memories that are accessed by intelligent learning agent 306.

In these illustrative examples, parts catalogs 308 are stored in data storage device 310. Data storage device 310 is any type of known or available device for storing data, including but not limited to, random access memory (RAM), non-volatile random access memory (NVRAM), read only memory (ROM), main memory, cache, a hard disk, a secondary storage device, such as a flash memory or floppy disk, or any other type of data storage device. For example, data storage device 310 may be a data storage device, such as storage 108 in FIG. 1.

User interface 312 is any type of known or available interface for providing input to computer 300, including but not limited to, a graphical user interface (GUI), a menu-driven interface, a command line interface, a touch screen, an alpha-numeric keyboard and mouse, voice recognition system, or any other method for entering input to computer 300 and receiving output from computer 300.

In the depicted example, parts catalogs 308 are stored on data storage device 310 in a local data storage device located on, or in association with, computer 300. However, parts catalogs 308 may also be located on one or more remote data storage devices located on one or more remote computers. For example, parts catalogs 314 include one or more parts catalogs stored on remote data storage device 316. Remote data storage device 316 is a storage device, such as data storage device 310 except that remote data storage device 316 is located on a computer remote to computer 300. Thus, computer 300 can access parts catalogs 308 located on or locally to computer 300 in addition to parts catalogs 314 located remotely to computer 300.

Remote data storage device 316 is accessed via server 318. Server 318 is any type of server, such as server 104 and 106 in FIG. 1. Server 318 can be a server on a network, such as network 102 described in FIG. 1. Computer 300 accesses server 318 via network device 320.

Network device 320 is any type of known or available network access software for allowing computer 300 to access a network. Network device 320 connects to a network connection, such as network 102 in FIG. 1. The network connection permits access to any type of network, such as a local area network (LAN), a wide area network (WAN), or the Internet. However, the illustrative embodiments may also be implemented on computer 300 without network device 320. In other words, the illustrative embodiments may be implemented in the absence of a network connection.

In this example, intelligent part substitution software 304 parses parts catalogs 308 to identify interchangeable parts. However, intelligent part substitution software 304 may also parse parts data in inventory 322 to identify duplicate and/or substitute parts. Inventory 322 is a list of parts, part numbers, and/or part number text descriptions corresponding to parts in current inventory. In one embodiment, parts catalogs 308 and inventory 322 are stored in associative memories that are accessed by intelligent learning agent 306.

A user may use intelligent part substitution software 304 to identify interchangeable parts in current inventory. In this manner, a user may reduce the number of duplicate parts in current inventory 322, as well as combine orders for interchangeable parts to leverage purchase quantity to obtain a better price for a given part.

Thus, in this example, a user inputs a part number at user interface 312 of computer 300. The part number entered by the user is a specified part number. Computer 300 sends the request to parts management database 302. Intelligent part substitution software 304 retrieves a corresponding part number description for the specified part number. Intelligent part substitution software 304 also retrieves part number descriptions for other part numbers from parts catalogs 308 and/or parts catalogs 314. Part number descriptions are free text entries describing a part associated with a given part number. Intelligent part substitution software 304 parses the text descriptions to identify duplicate parts, alternative parts, and potential alternative parts. Intelligent part substitution software 304 generates a list of these duplicate and alternative parts for the specified part number.

Parts management database 302 is then able to present the user with a list of all duplicate parts and substitute parts for a specified part. If the specified part is a set, parts management database 302 is able to provide a list of all duplicate and substitute parts for the subparts of the set of parts. In this manner, the illustrative embodiments use associative memory learning agent technology to identify duplications, substitutions, and subsets of sets in parts catalogs even when the part number descriptions vary by wording, spelling, abbreviations, symbols, and terminology. The list of duplicate and substitute parts include the relative ranking or similarity score indicating how similar each part is to the specified part.

In this example, the greater the ranking or similarity score, the more likely it is that the other part is an acceptable substitute for the specified part. However, any type of ranking system may be used. For example, a part number that is a duplicate or closest match to act as an alternate part for a specified part may be given a lowest rank or similarity score.

Figure 4:
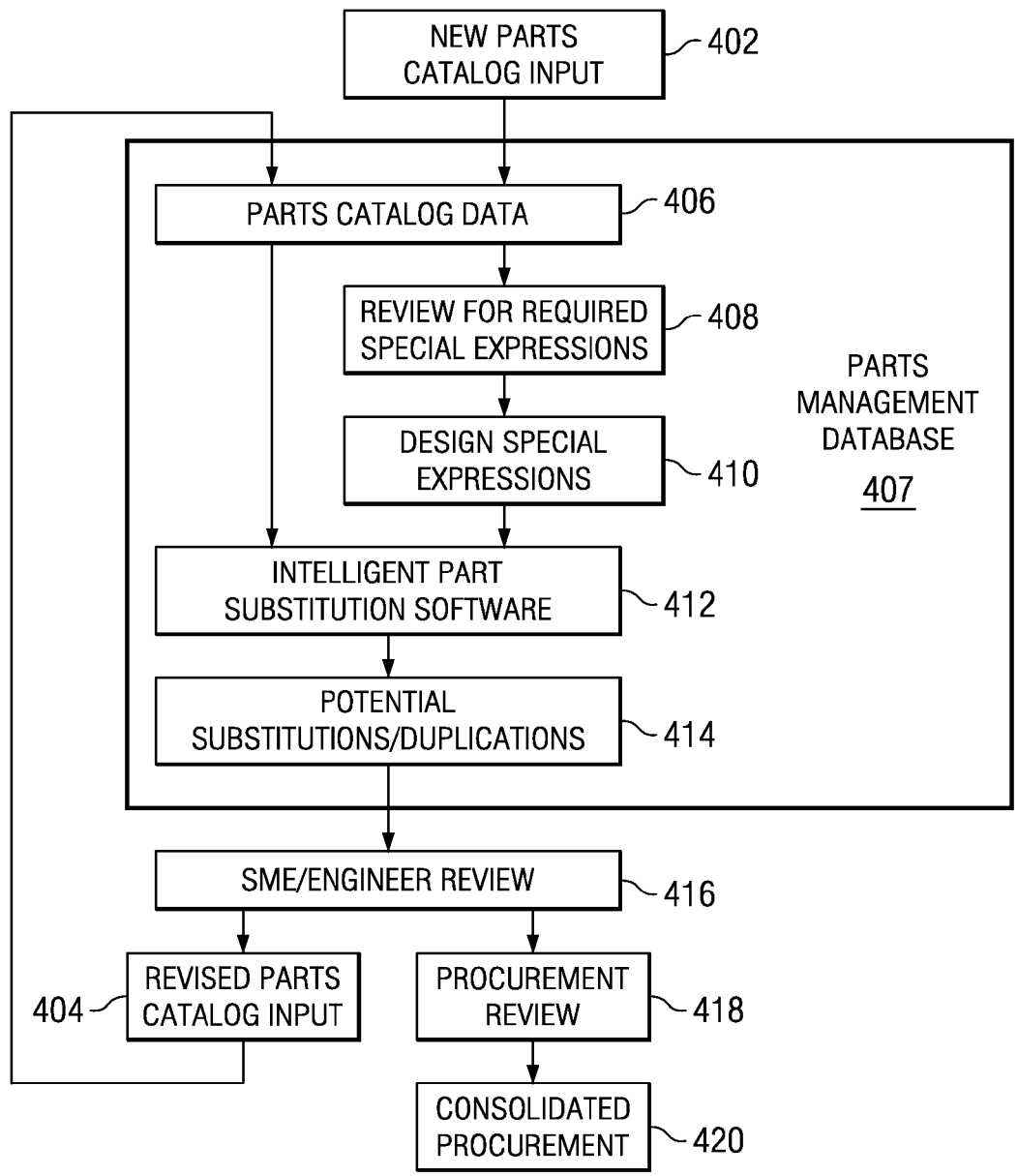
FIG. 4 is a diagram of a process flow in a relational database system when parts catalog data is entered into a parts management database in accordance with an advantageous embodiment of the present invention.

FIG. 4 is a diagram of a process flow in a relational database system when parts catalog data is entered into a parts management database in accordance with an advantageous embodiment of the present invention. In this embodiment, new parts catalog input 402 is information regarding part numbers and part number descriptions for new parts. New parts catalog input 402 may include, for example, electronic parts catalog data downloaded over a network, retrieved from a data storage device, such as a compact disc rewritable (CD-RW) or a flash memory, or any other source for electronic data. New parts catalog input 402 may also include new parts data manually entered into a computer, such as computer 300 in FIG. 3, by a user.

Revised parts catalog input 404 is revised or updated part numbers and/or part number descriptions. Revised parts catalog input 404 may be received when platforms are modified over time and/or replacement or substitute parts are introduced into a commodity. Revised parts catalog input 404 may be appended to parts catalog data 406.

Parts catalog data 406 is data in one or more parts catalogs, such as parts catalogs 308 and/or parts catalogs 314 in FIG. 3. Parts catalog data 406 is retrieved by parts management database 407. Parts management database 407 is a parts management database, such as parts management database 302 in FIG. 3.

Parts management database 407 reviews parts catalog data 406 for review for required special expressions 408. A special expression is a combination or pattern of letters, numbers, and/or symbols in a text description corresponding to a part number that has a special meaning, depending on the type of part being described. For example, if the text description is a description of a bolt and includes the expression "¼×1-20", intelligent part substitution software 412 will check a special expressions database to determine if the expression "¼×1-20" has a special meaning. In this example, "¼×1-20" is a special expression that means the bolt is one-quarter inch in diameter by one inch in length and has twenty strands. This special meaning is associated or paired with the expression "¼×1-20" to indicate that this combination of numbers and symbols indicates a bolt with one-quarter inch diameter by one inch length and twenty strands. Intelligent part substitution software 412 uses special expressions to build associative structures in associative memory.

In other words, if intelligent part substitution software 412 is parsing part descriptions in a given part catalog, special expressions may be used to train intelligent part substitution software 412 to recognize certain letters, numbers, and words as being equivalent to one or more descriptive words. Special expressions may have associated special meanings that vary depending on the type of part being described. Thus, special expressions are used to build a set of entity definitions that have to do with the specific universe/type of part that is being described.

Thus, special expressions are parameters defining part-specific attributes in part number descriptions. A part-specific attribute is a descriptor defining an attribute of a given part. For example, 2.5 inches is a part-specific attribute of a fastener. Likewise, zinc-coated is a part-specific attribute of a bolt. Parts management database 407 recognizes attributes based on parameters defined by special expressions in an attribute matrix of parts management database 407. Parts management database 407 may also design new special expressions. Parts management database 407 may design special expressions 410 based on attribute patterns in new parts catalog input 402. An attribute pattern is a series of words, letters, numbers, or symbols that forms an attribute. Thus, the sequence of letters and symbols 2½ is an attribute pattern corresponding to 2.5 inches. Likewise, a user may enter new special expressions into parts management database 407 to define new attributes and attribute patterns.

In this example, parts data and special expressions are stored in parts management database 407. However, in accordance with the illustrative embodiments, parts data and special expressions may be stored in any manner and/or in any format. For example, parts catalog data may be stored in any type of data structure, including but not limited to, an Excel database or a web-based application. Parts catalog data stored in a storage device, such as parts management database 407 may be accessed using MySQL® or Java®.

Intelligent part substitution software 412 may be a word based intelligent learning agent. Intelligent part substitution software 412 parses text descriptions for parts to identify associations between words, numbers, and symbols. Intelligent part substitution software 412 uses special expressions and parts catalog data 406 to identify and generate a list of potential substitutions/duplications 414. Intelligent part substitution software 412 is an intelligent learning agent, such as intelligent learning agent 306 in FIG. 3.

Subject matter expert (SME)/engineer review 416 reviews the potential substitute parts and duplicate parts provided by parts management database 407. SME/Engineer review 416 performs procurement review 418 to determine whether to combine orders of different part numbers that are interchangeable parts for consolidated procurement 420. Consolidated procurement 420 is the consolidating of two or more different part numbers for interchangeable parts into an order for a single part number. In other words, rather than ordering fifty of part number one and fifty of part number two, consolidated procurement 420 will order 100 of part number one and none of part number two if part number one and part number two are interchangeable parts.

Procurement review 418 may also determine whether to reduce the stock of one or more interchangeable parts to reduce inventory costs. Thus, if fifty of part number one is maintained in stock and fifty of part number two is maintained in stock, procurement review 418 may determine to maintain only fifty of part number one and none of part number two to reduce inventory where part number one and part number two are duplicate parts.

If SME/engineer review 416 decides to alter a platform by replacing a specified part with an alternate or substitute part number for a specified part in the platform, revised parts catalog input 404 may be entered to update parts catalog data 406 with data regarding the replacement part.

In this example, substitute parts and duplicate parts are interchangeable with the specified part. In other words, substitute parts and duplicate parts are identical or sufficiently similar to the specified part such that the substitute or duplicate part may be used in place of the specified part.

Figure 5:
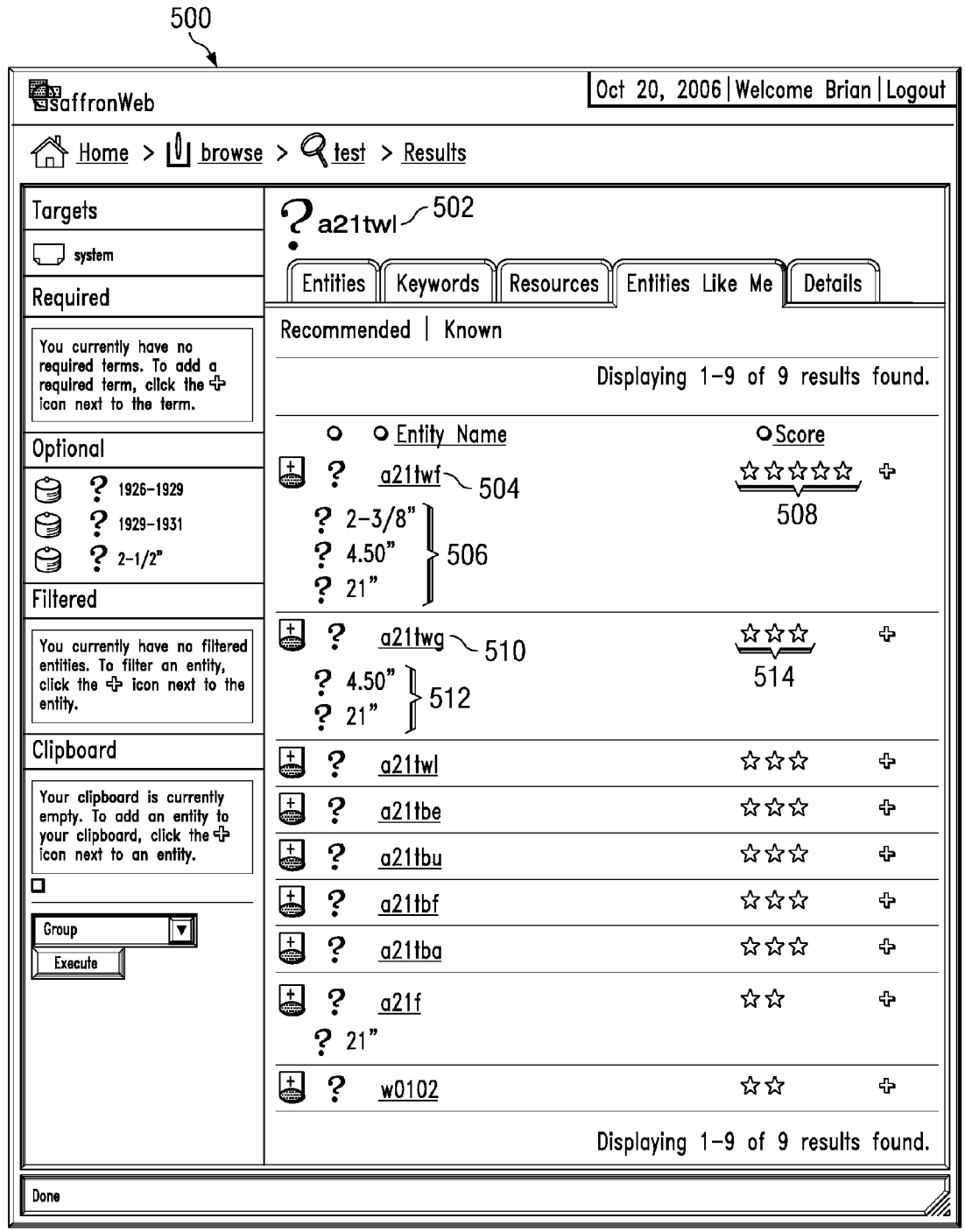
FIG. 5 is a diagram illustrating an interchangeable part number results screen in accordance with an advantageous embodiment of the present invention.

FIG. 5 is a diagram illustrating an interchangeable part number results screen in accordance with an advantageous embodiment of the present invention. Interchangeable part numbers result screen 500 is an example of a screen displaying part numbers for duplicate and substitute parts for a specified part. Specified part number 502 is a part number entered by a user for a specified part. In this example, specified part number 502 is a part number for a tire.

Interchangeable part number 504 is a highest ranked interchangeable part identified by a parts management database. Interchangeable part number 504 is identified in accordance with selected attributes 506. Selected attributes 506 are attributes having significance for identifying interchangeable parts. In other words, attributes, such as tire size measurements, are attributes of some significance in identifying parts that are interchangeable. In contrast, an attribute, such as the package that the part is packed in, would not be a significant attribute.

Significant attributes are identified by parts management database as attributes that do not occur in a majority of part number descriptions. For example, if all part number descriptions for tires include that the tire is made of rubber, the attribute of rubber material is not significant based on the fact that all part numbers share this attribute. In contrast, an attribute, such as 2⅜ for a measurement, may be significant if the measurement occurs in the part number description for the specified part and only occurs in some of the part number descriptions in a set of part number descriptions compared to the specified part number description. In this case, attributes 506 are measurements 2⅜", 4.50" and 21." These attributes are significant attributes because they are not attributes common to all part number descriptions being compared to specified part number 502.

In this example, part numbers are listed in decreasing order form the most relevant or closest match to the least relevant or least likely match to specified part number 502. In addition, part numbers are listed with a ranking. In this example, part numbers are ranked with one to five stars, where five stars indicates a closest or best match to the specified part. However, the illustrative embodiments are not limited to a ranking system ordering parts in descending order form most relevant to least relevant or a five star ranking system. In accordance with the illustrative embodiments, part numbers in interchangeable part numbers result screen 500 may be sorted and ranked in accordance with any known or available method for ranking parts. For example, part numbers may be ranked with a percentage or a number value indicating relevance or closeness of a match with a specified part.

In this example, interchangeable part number 504 has a ranking of five stars 508. This ranking indicates that interchangeable part number 504 is a closest match to specified part number 502. Interchangeable part number 504 is also listed first in the list of results. This also indicates that interchangeable part number 504 is a closest match to specified part number 502.

Part number 510 is also a potential interchangeable part provided in interchangeable part number results display 500. In this example, part number 510 includes matching attributes 512 of 4.50" and 21" size measurements. However, part number 510 does not match specified part number 502's attribute measurement 2⅜. Thus, specified part number 502 is not the most relevant potential interchangeable part. Therefore, part number 510 only has a ranking of three stars 514. Although part number 510 is a somewhat relevant part number, part number 510 is not a best or closest match with specified part number 502. In fact, if the measurement 2⅜ is a critical attribute, specified part number 502 may not be an interchangeable part with interchangeable part number 504 at all.

Figure 6:
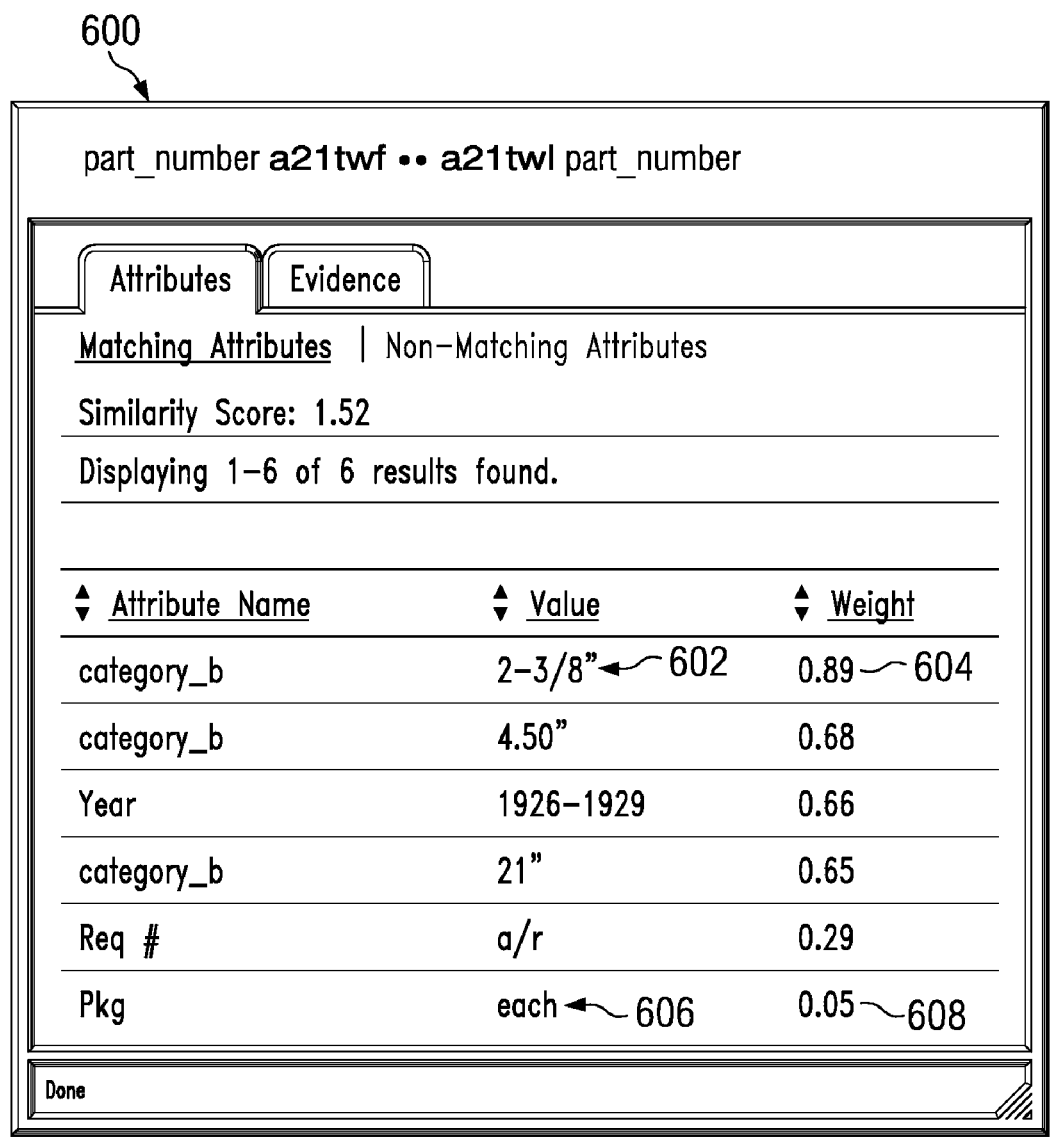
FIG. 6 is a diagram illustrating a weighted list of selected attributes in accordance with an advantageous embodiment of the present invention.

Turning now to FIG. 6, a diagram illustrating a weighted list of selected attributes is depicted in accordance with an advantageous embodiment of the present invention. Attribute list 600 is a list of selected attributes listed in order of weight. In other words, a parts management database identifies multiple attributes from a specified part number description. However, all of these attributes are not useful for identifying interchangeable parts. Attributes that are common to all or a majority of comparison part number descriptions will not be useful in identifying duplicate or substitute part numbers. A comparison part number description is a part number description that is being compared to a specified part number description to determine if the comparison part number is a potential duplicate or substitute part.

If an attribute occurs in a number of comparison part number descriptions that is greater than a threshold number, the attribute is not selected as a relevant or unique attribute. Instead, the attribute is discarded. If the attribute is identified in a number of comparison part number descriptions that is not greater than the threshold number of comparison part number descriptions, the attribute is selected as a significant or relevant attribute.

In another embodiment, the parts management database selects attributes based on the type of attribute. For example, if the attribute is an attribute related to size measurements, properties, composition, materials used in manufacture, or other relevant attribute type, the attribute is selected. If the attribute is an irrelevant attribute type, such as type of packaging the part is shipped in, then the attribute is disregarded or discarded.

In another example, a user may select attribute types for the selected attribute types. The user may also select attribute types to be discarded. The illustrative embodiments may also utilize any combination of attribute types, attribute counts and thresholds, and/or user selection of attributes.

In this example, attribute 602 with attribute name "category$_{13}$ b" and value "2⅜" is a selected attribute that only occurred in one comparison part number description. Attribute 602 is a value that seems to be unique and/or a significant discriminator. In this example, attribute 602 is given a weight of 0.89 604. The weight is any arbitrary value that indicates the significance or uniqueness of a selected attribute. The less frequently the selected attribute is identified in comparison part number descriptions, the more unique or useful the attribute is as a discriminator. Thus, in this case, the attribute for value 2⅜ identified in the specified part number only occurred in a single comparison part number description. Therefore, attribute 602 is given a highest weighted value.

Attribute 606 is an attribute name package (Pkg) with a value "each." This attribute is not a unique or useful discriminator. Therefore, attribute 606 is given a low weight of 0.05 608. Attribute 606 will likely be discarded or disregarded due to the fact that this attribute is not unique or useful as a discriminator.

Thus, in this illustrative embodiment, an attribute is weighted based on the occurrence of the attribute in the specified part number description, the occurrence of the attribute in a given comparison part number description, and also the occurrence or lack of occurrences of the attribute in all of the comparison part number descriptions being compared to the specified part number description.

FIG. 7 is a diagram illustrating a list of potential interchangeable parts results in accordance with an advantageous embodiment of the present invention. List of results 700 is a list of potential interchangeable parts provided in a ranked order descending from closest matching or most relevant part to least relevant part number. In this example, specified part number 702 "a21tw1" is a specified part number entered by a user. Interchangeable part number 704 "a21twf" is a closest matching potential interchangeable part. In this case, interchangeable part number 704 is a duplicate part provided by a different supplier and identified by a different part number than specified part number 702. Thus, a user can replace specified part number 702 with interchangeable part number 704.

Figure 8:
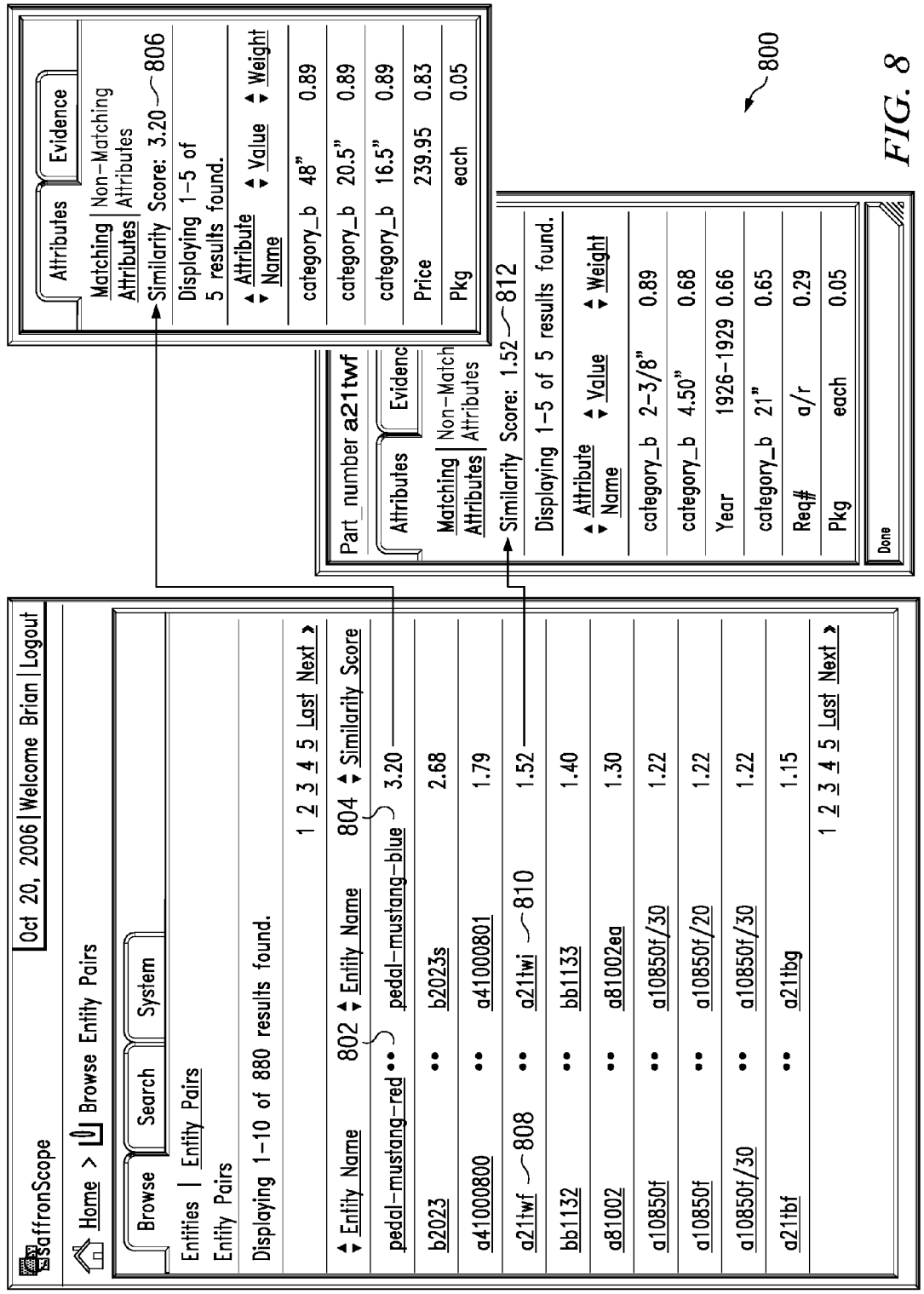
FIG. 8 is a diagram illustrating an interchangeable part number result list with similarity scores in accordance with an advantageous embodiment of the present invention.

Turning now to FIG. 8, a diagram illustrating an interchangeable part number result list with similarity scores is shown in accordance with an advantageous embodiment of the present invention. Entity pairs 800 are a display screen showing a specified part number and a corresponding interchangeable part number with a similarity score. Entity 802 is a red mustang pedal car. Entity 802 is a specified part. Entity 804 is a blue mustang pedal car. Entity 804 may be an interchangeable part for entity 802. In other words, entity 804 may be sufficiently similar to entity 802 that entity 804 can be substituted for entity 802. The degree of similarity between entity 802 and entity 804 can be described by means of similarity score 806. Similarity score 806 is any arbitrary score value to indicate a degree of similarity between specified part and an interchangeable part. In this example, entity 804 is an interchangeable part that has similarity score 806 of 3.20.

Entity 808 is a specified part number "a21twf" for a tire. Entity 810 is an interchangeable part number "a21twi" that is identical to entity 808 with the exception that entity 810 is produced by a different manufacturer. Entity 810 has similarity score 812 indicating that entity 810 is a duplicate part. Again, similarity score 812 is a score determined in accordance with any known or available method for indicating a similarity between parts. A user may determine whether to substitute an interchangeable part for a specified part based on the similarity scores. Likewise, a user may decide to consolidate multiple part numbers in procurement orders based on similarity scores for the parts and the attributes for the potential interchangeable parts.

FIG. 9 is a diagram illustrating an interchangeable part result page with weighted attributes in accordance with an advantageous embodiment of the present invention. Result page 900 includes part number 902 "msk4301", which is a part number for an engine part specified by a user. Part number 904 "msk4301hu" is a part number for a potential interchangeable part. Part number 906 "msk4301hs" is another potential interchangeable part.

Part number 904 has a similarity score of 5.33 908. Part number 906 has a similarity score of 4.42 910. In this example, a higher similarity score indicates a part that is more similar to the specified part. Based on these similarity scores, part number 904 is the closest match to part number 902. However, a degree of similarity may be indicated in accordance with any scoring, ranking, classification, ordering, grading or sorting method.

Part number 904 includes attribute 911 named "JESD 30 Code" with a weight of 0.89. Part number 910 does not have attribute 911 in the part number description for part number 910. However, part number 910 and part number 904 have the attribute document title 912 and 914, respectively. Thus, part number 904 is the closest match because the part number description for part number 904 includes unique attribute 911 that is not included in a description for part number 906. Therefore, a user may decide to substitute part number 906 for part number 902 in this example.

Figure 10:
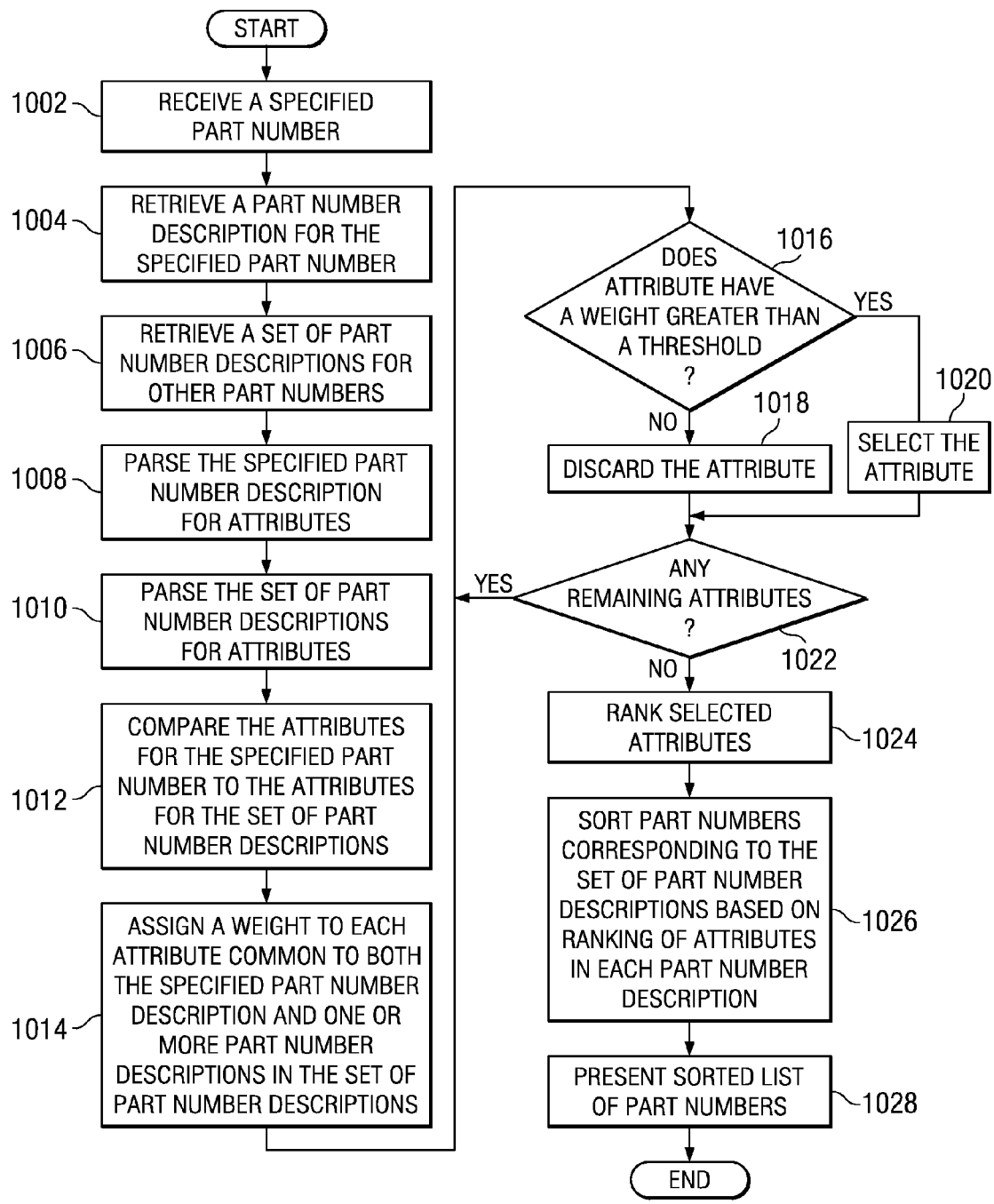
FIG. 10 is a flowchart of a process for identifying interchangeable parts from parts catalogs in accordance with an advantageous embodiment of the present invention.

Referring now to FIG. 10, a flowchart of a process for identifying interchangeable parts from parts catalogs is depicted in accordance with an advantageous embodiment of the present invention. The process illustrated in FIG. 10 is implemented by a software component for using associative memory learning agent technology to identify duplications, substitutions, and subsets of sets in parts catalogs. In this example, the process is implemented by intelligent part substitution software, such as intelligent part substitution software 304 in FIG. 3.

The process begins when a specified part number is received (operation 1002). The process retrieves a part number description for the specified part number (operation 1004). In one example, part number description data is retrieved from one or more parts catalogs in the relational database system. The process also retrieves a set of part number descriptions for other part numbers (operation 1006). These other part numbers are part numbers to be compared to the specified part number to determine if any of the other part numbers are duplicate or substitute parts for the specified part. These parts may be referred to as comparison part numbers.

The process parses the specified part number description for attributes (operation 1008). The process uses parameters to identify the attributes. Parameters are specified in special expressions in an intelligent learning agent in the relational database system. The process also parses the set of part number descriptions for the comparison attributes (operation 1010). The process compares the attributes identified in the specified part number description with the attributes identified in the set of part number descriptions for the comparison part numbers (operation 1012). The comparison of text description and special expressions for each part in a set of part number descriptions looks for similarities in all entries in all fields for a given part in a parts catalog. This comparison may be performed by an intelligent learning agent, such as intelligent learning agent 306 in FIG. 3.

Next, the process assigns a weight to each attribute identified in the specified part number description that is common to one or more part number descriptions in the set of part number descriptions (operation 1014). The weight is assigned based on the type of attribute, the number of part number descriptions that include the attribute, a user defined weight for an attribute, and/or any other factors for assigning a weight to an attribute.

The process makes a determination as to whether an attribute has a weight greater than a threshold value (operation 1016). If the threshold is less than or equal to the threshold, the process discards the attribute (operation 1018). If the weight is greater than the threshold, the process selects the attribute (operation 1020). A weight is discarded if the weight indicates that the attribute is not unique or useful as a discriminator.

Next, the process makes a determination as to whether any remaining un-weighted attributes remain (operation 1022). If any un-weighted attributes remain, the process returns to operation 1016 and iteratively continues executing operations 1016-1022 until no un-weighted attributes remain.

Returning now to step 1022, if no un-weighted attributes remain, the process ranks the selected attributes in accordance with the weight assigned to each attribute (operation 1024). Next, the process sorts the part numbers corresponding to the set of part number descriptions based on the ranking of the attributes identified in each part number description (operation 1026). The process then presents the sorted list of potential interchangeable part numbers to a user (operation 1028) with the process terminating thereafter.

Figure 11:
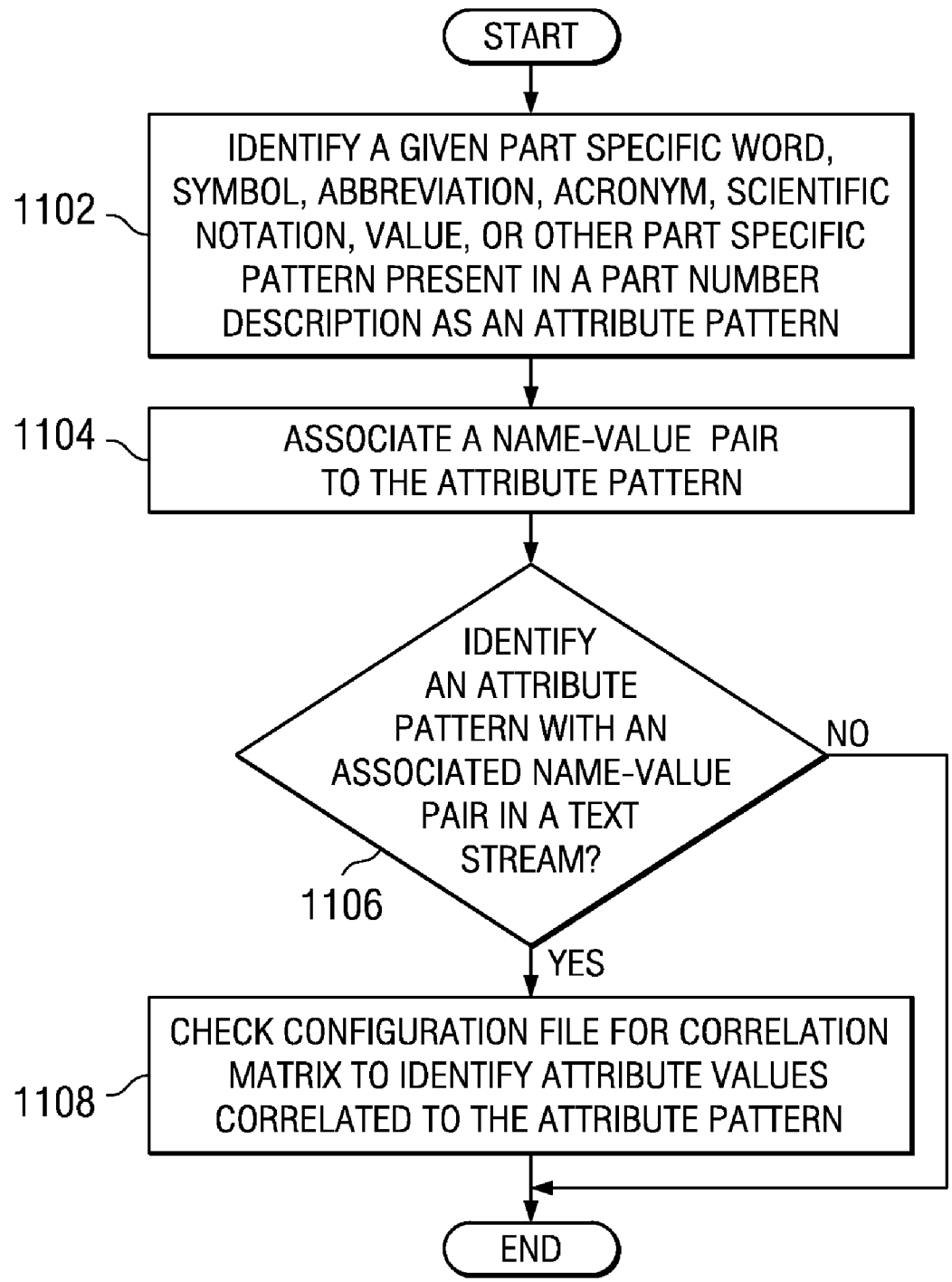
FIG. 11 is a flowchart of a process for identifying attributes in a part number description in accordance with an advantageous embodiment of the present invention.

FIG. 11 is a flowchart of a process for identifying attributes in a part number description in accordance with an advantageous embodiment of the present invention. The process illustrated in FIG. 11 is implemented by a software component for using associative memory learning agent technology to identify duplications, substitutions, and subsets of sets in parts catalogs. In this example, the process is implemented by intelligent part substitution software, such as intelligent part substitution software 304 in FIG. 3.

The process begins by identifying a given part specific word, symbol, abbreviation, acronym, scientific notation, value, or other part-specific pattern present in a part number description as an attribute pattern (operation 1102). Next, the process associates a name-value pair to the attribute pattern (operation 1104). The name value pair is a value corresponding to the attribute pattern. The process uses the name value pair to determine whether an attribute pattern in one part number description correlates to a different part number description that may vary due to spelling, abbreviations, or other variations in text descriptions.

The process makes a determination as to whether an attribute pattern with an associated name-value pair is identified in a text stream (operation 1106). If an attribute pattern is not identified, the process terminates thereafter.

Returning to step 1106, if an attribute pattern with an associated name-value pair is identified, the process checks a configuration file for a correlation matrix in a parts management database to identify attribute values correlated to the attribute pattern (operation 1108) with the process terminating thereafter. For example, if an attribute pattern is 150 volts, the name-value pair for that attribute pattern may indicate that 150 volts corresponds to attribute values of "150V." In this manner, the correlation matrix can identify corresponding descriptions of parts even where the text descriptions of the parts vary due to spelling, abbreviations, or other variations. As used herein, the correlation matrix is the set of name-value pairs and correlation parameters used to compare text descriptions from a specified part number with text descriptions describing other part numbers.

Advantageous embodiments of the present invention provide a computer implemented method, apparatus, and computer usable program code for identifying interchangeable parts in parts catalogs. In one illustrative embodiment, the process parses a free text description associated with the specified part number for attributes of the specified part number in response to receiving a specified part number. The process compares the attributes of the specified part number to a set of attributes identified for different part numbers based on a set of name-value pairs associated with each attribute. The process then assigns a weight to each attribute in the set of attributes based on whether each attribute is correlated to an attribute of the specified part number. The process ranks the different part numbers based on the weight assigned to each attribute associated with each different part number. The process also identifies a set of interchangeable parts based on the ranking of the different part numbers, wherein a different part with a highest ranking is a closest match to the specified part number.

Thus, the illustrative embodiments enable a user to identify duplicate parts, substitute parts, and subsets of a set of parts in parts catalogs to optimize the utilization of repair parts stockage and procurement funding. This is advantageous because companies frequently have significant investment in repair parts. The embodiments enable users to consolidate purchase orders of two or more interchangeable parts to leverage purchase quantity to drive down part costs. In other words, rather than buying one hundred parts of a first part number and one hundred parts of a second part number that is an interchangeable part, a user can order two hundred parts of the first part number to leverage purchase quantity to obtain a lower price per part.

Likewise, if a user determines that twenty of a first part number is needed and thirty surplus parts of an interchangeable part number is available in current inventory, the user can use twenty of the second part number in current inventory rather than purchasing twenty of the first part number. In this manner, a user can combine orders for duplicate and substitute parts to leverage part purchase, decrease the costs of procurement and storage of repair parts, and reduce current inventory.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying interchangeable parts, the computer implemented method comprising:

identifying, by an intelligent agent running on a processing unit, first attributes for a set of parts in a set of catalogs by identifying patterns in text descriptions associated with each part in the set of parts to form name-value pairs for each of the first attributes;

comparing, by the intelligent agent, the first attributes for the set of parts to a set of second attributes for a selected part;

assigning a weight to each of the first attributes based on whether each of the first attributes is correlated to an attribute in the set of second attributes, wherein the weight assigned is inversely proportional to a quantity of parts in the set of parts that have the each of the first attributes;

ranking each part in the set of parts using the weight assigned to each attribute in the first attributes; and identifying a set of interchangeable parts using the ranking for each part in the set of parts.

2. The computer implemented method of claim 1 further comprising:

parsing a description from a parts catalog associated with the selected part for the set of second attributes.

3. The computer implemented method of claim 1 further comprising:

reviewing the set of interchangeable parts for consolidated procurement of parts.

4. The computer implemented method of claim 1 further comprising:

parsing text descriptions associated with each part in the set of parts to identify the first attributes, wherein the text descriptions are the text descriptions obtained from the set of catalogs.

5. The computer implemented method of claim 1 wherein an interchangeable part is a duplicate part for the selected part.

6. The computer implemented method of claim 1 wherein assigning the weight to the each of the first attributes based on whether the each of the first attributes is correlated to the attribute in the set of second attributes further comprises:

determining whether a second attribute in the set of second attributes occurs in more than a threshold number of parts in the set of parts; and responsive to a determination that the second attribute in the set of second attributes occurs in more than the threshold number of parts, excluding the second attribute from the weight assigned to the each of the first attributes.

7. The computer implemented method of claim 1 further comprising:

responsive to a determination that the weight assigned to a given attribute is less than or equal to a threshold weight, discarding the given attribute.

8. The computer implemented method of claim 1 further comprising:

responsive to a determination that the weight assigned to a given attribute is greater than a threshold weight, selecting the given attribute to form a set of selected attributes.

9. The computer implemented method of claim 8 further comprising:

ranking each attribute in the set of selected attributes, wherein the weight of each selected attribute indicates whether the selected attribute is a useful discriminator for identifying an interchangeable part.

10. The computer implemented method of claim 1 further comprising:

consolidating a purchase order containing two or more interchangeable part numbers by replacing the two or more interchangeable part numbers in the purchase order with a greater quantity of a single part number in the two or more interchangeable part numbers.

11. The computer implemented method of claim 1 further comprising:

responsive to identifying an attribute with an associated name-value pair, checking a configuration file to identify a value correlated to the attribute.

12. The computer implemented method of claim 1 wherein an attribute is selected from a group consisting of a word, a symbol, an abbreviation, an acronym, a scientific notation, and a value.

13. The computer implemented method of claim 1 wherein assigning a weight to each attribute further comprises:

identifying a special expression in a text description for a part;

identifying an attribute corresponding to the special expression to determine a similarity between different parts.

14. The computer implemented method of claim 1 wherein comparing the first attributes to the second attributes further comprises:

using a set of name-value pairs associated with each attribute.

15. The computer implemented method of claim 1 wherein the ranking indicates a degree of similarity between a different part and the selected part, and wherein the different part with a highest ranking is a part from the set of parts that is the most similar to the selected part.

16. A computer program product comprising:

a non-transitory computer usable medium including computer usable program code for identifying interchangeable parts in parts catalogs, said computer program product comprising:

computer usable program code for identifying, by an intelligent agent running on a processing unit, first attributes for a set of parts in a set of catalogs by identifying patterns in text descriptions associated with each part in the set of parts to form name-value pairs for each of the first attributes;

computer usable program code for comparing, by the intelligent agent, the first attributes for the set of parts to a set of second attributes for a selected part;

computer usable program code for assigning a weight to each of the first attributes based on whether each of the first attributes is correlated to an attribute in the set of second attributes, wherein the weight assigned is inversely proportional to a quantity of parts in the set of parts that have the each of the first attributes;

computer usable program code for ranking each part in the set of parts using the weight assigned to each attribute in the first attributes; and computer usable program code for identifying a set of interchangeable parts using the ranking for each part in the set of parts.

17. The computer program product of claim 16 wherein the computer usable program code for comparing the first attributes to the set of second attributes further comprises:

computer usable program code for using a set of name-value pairs associated with each attribute.

18. The computer program product of claim 16 wherein the ranking indicates a degree of similarity between a different part and the selected part, and wherein the different part with a highest ranking is a part from the set of parts that is the most similar to the selected part.

19. An apparatus comprising:

a bus system;

a communications system connected to the bus system;

a memory connected to the bus system, wherein the memory includes computer usable program code; and a processing unit connected to the bus system, wherein the processing unit executes the computer usable program code to identify, by an intelligent agent running on a processing unit, first attributes for a set of parts in a set of catalogs by identifying patterns in text descriptions associated with each part in the set of parts to form name-value pairs for each of the first attributes; compare, by the intelligent agent, the first attributes for the set of parts to a set of second attributes for a selected part; assign a weight to each of the first attributes based on whether each of the first attributes is correlated to an attribute in the set of second attributes; rank each part in the set of parts using the weight assigned to each attribute in the first attributes; and identify a set of interchangeable parts using the ranking for each part in the set of parts.

20. The apparatus of claim 19 wherein the ranking indicates a degree of similarity between a different part and the selected part, and wherein the different part with a highest ranking is a part from the set of parts that is the most similar to the selected part.

21. The computer implemented method of claim 1, wherein identifying the first attributes for the set of parts in a set of catalogs by identifying the patterns in the text descriptions associated with the each part in the set of parts to form the name-value pairs for each of the first attributes comprises:

searching a data source for each pattern to determine whether an expression represented by the each pattern indicates an attribute for the each part.

* * * * *

UNITED STATES PATENT AND TRADEMARK OFFICE
CERTIFICATE OF CORRECTION

PATENT NO. : 8,161,045 B2  
APPLICATION NO. : 11/670210  
DATED : April 17, 2012  
INVENTOR(S) : Arnold et al.

Page 1 of 1

It is certified that error appears in the above-identified patent and that said Letters Patent is hereby corrected as shown below:

On Cover Page, Section (75), Line 3, please delete "Leonard Jon Ouadracci, Seattle, WA (US)" and insert -- Leonard Jon Quadracci, Seattle, WA (US) --

Signed and Sealed this  
Third Day of July, 2012

David J. Kappos  
*Director of the United States Patent and Trademark Office*